United States Patent [19]

Arguelles

[11] 4,032,981

[45] June 28, 1977

[54] MULTIPLE SELECTION SOUND REPRODUCING APPARATUS

[75] Inventor: Victor Victoriano Arguelles, Rio de Janeiro, Brazil

[73] Assignee: Pevi Aparelhos S.A., Sao Paulo, Brazil

[22] Filed: Oct. 17, 1975

[21] Appl. No.: 623,298

[52] U.S. Cl. .......................... 360/69; 179/6.3 MA; 360/61; 360/72; 360/78; 360/137

[51] Int. Cl.² ................. G11B 15/02; G11B 15/18; G11B 21/08; H04M 17/02

[58] Field of Search .................. 360/72, 74, 91, 92, 360/78, 106, 93, 71, 61, 137, 69; 340/162; 179/6.3 MA

[56] References Cited

UNITED STATES PATENTS

| | | | |
|---|---|---|---|
| 2,551,522 | 5/1951 | Andres | 340/162 |
| 2,612,710 | 10/1952 | Fuller | 340/162 |
| 2,908,767 | 10/1959 | Fritzinger | 360/74 |
| 2,944,116 | 7/1960 | Vershoven | 360/72 |
| 3,080,456 | 3/1963 | Osborne et al. | 360/72 |
| 3,109,898 | 11/1963 | Gray | 360/92 |
| 3,183,005 | 5/1965 | Rockola | 340/162 |

*Primary Examiner*—Robert S. Tupper
*Attorney, Agent, or Firm*—Sughrue, Rothwell, Mion, Zinn & Macpeak

[57] ABSTRACT

A sound reproducing apparatus having a limited selection effected by the introduction of a coin or disc comprising a multi-channel cartridge tape reproducer having selection means for selecting a desired channel. The tape reproducer is preferably of the stereophonic type having four channel positions and the selection is effected not only with respect to a desired channel but also to a desired track so that each track on the tape can be recorded separately so as to give a selection of any one of eight tracks. Each track is recorded with a series of recordings having a common characteristic, for example, the same interpreter or singer, and the apparatus is provided with structure for stopping the tape, that is, terminating a given selection, after the reproduction of one of the recordings on the respective track. Selection is therefore made with respect to a singer or interpreter rather than to the particular interpretation to be reproduced. Preferably the tape is of the mono-directional endless type.

8 Claims, 6 Drawing Figures

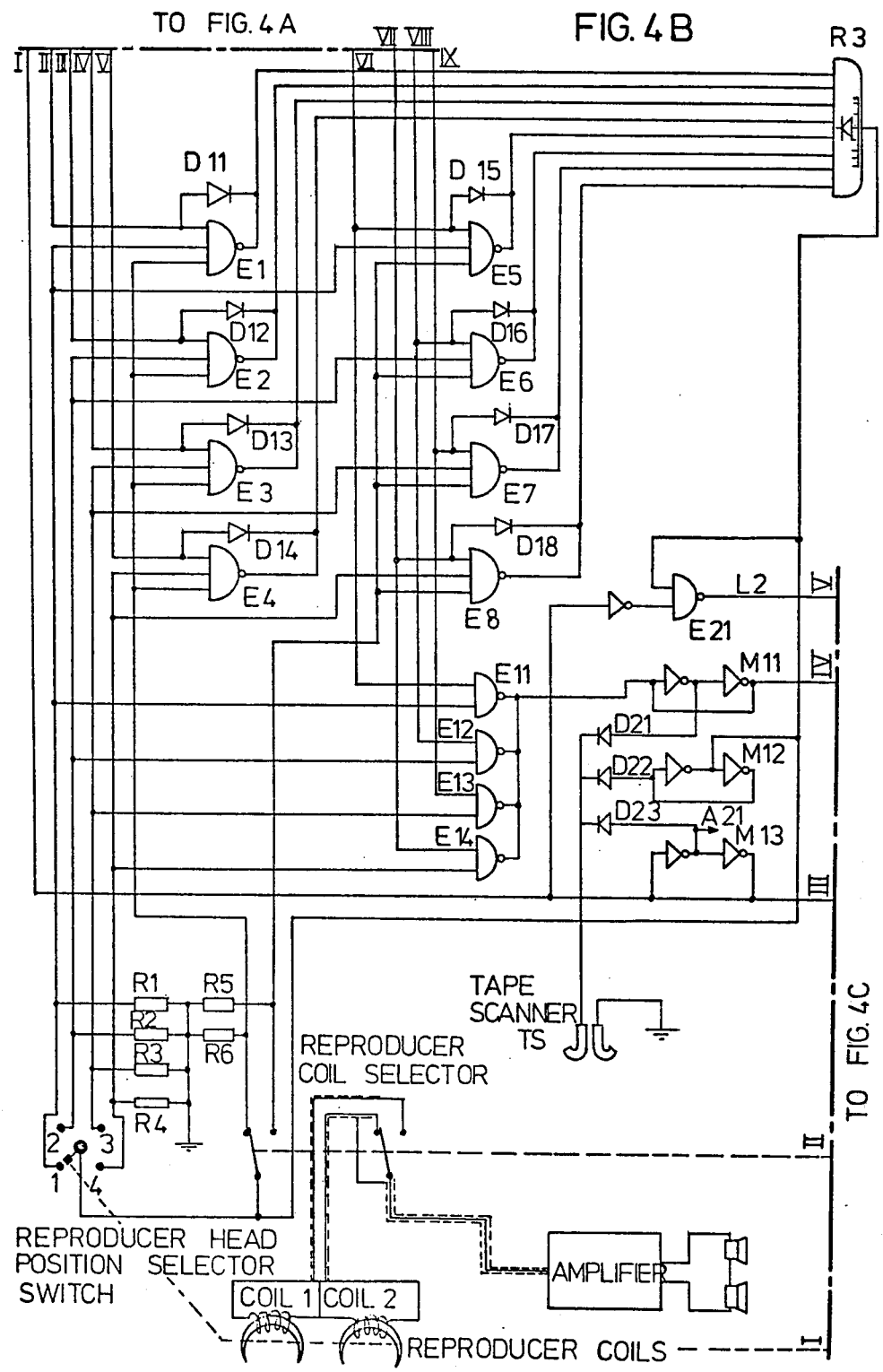

MULTIPLE SELECTION SOUND REPRODUCING APPARATUS

The present invention refers to a multiple selection sound reproducing apparatus.

In the past multiple selection reproducers have normally taken the form of the so-called juke-box provided with a very large number of selections of records which, after the insertion of the coin and the appropriate selection of the record, employ an expensive and complicated electro-mechanical mechanism for retrieving the selected record from a track and placing it with the selected side up on a turntable.

Alternatively, juke-boxes are also known using a selection and retrieval system for magnetic tape cartridges. In both cases the multiple selection is very large, the electromechanical arrangement is complicated and the manufacturing costs are elevated.

The applicant has discovered that in any given location, the average selection made by the users of the apparatus at any given time is usually limited to recordings of songs made by a small number of singers, this signifying that the majority of these selections have very infrequent use. In economical terms, the inclusion of such unused selections is the reason for having to manufacture a machine of the complicated and expensive nature of a juke-box. The applicant also discovered that the number of singers usually selected at any given time rarely exceeds about eight. In other words there is an up until now undiscovered demand for cheap, limited selection sound reproducers.

A further point observed by the applicant is that the normal selections are more limited to the singers themselves than to the songs that they sing. In other words a recording made by a pop star in vogue will be selected almost independently of the merit of the individual recordings.

According to the present invention, a multiple selection sound reproducing apparatus comprising a multi-channel cartridge tape reproducer having a tape drive motor, selection means for selecting a desired channel and coin or disc insertion means connected to make said selection means operative.

According to a preferred aspect of the present invention there is provided a multiple selection sound reproducing apparatus which is operated by a coin or disc, utilizing a four-track stereophonic tape cartridge of the monodirectional type, that is to say an endless tape, and a four channel mono-directional stereophonic reproducer. Since each of the channels comprises two recording tracks for which two transducer heads are normally used for stereophonic reproduction, the apparatus of the present invention uses each transducer head separately, the two tracks of any given channel being recorded with different musical items. Effectively, therefore, the preferred apparatus of the invention gives a choice of eight tracks.

Each track is dedicated to a single singer or interpreter and recorded with a number of interpretations, the number being determined by the duration of each song and the length of the endless tape. Normally speaking, there is space on the tape for four recordings on each track, this giving a total of 32 different songs for selection from the apparatus.

As mentioned above, it has been found that the public has a greater tendency to select the singer rather than the song. Consequently the selection system of the present apparatus serves merely to select one of the eight singers. When a coin is introduced, the user selects one of the singers and the apparatus will then play automatically one number from the track of the tape recorded by that singer. The different songs on any given track are separated by the recording of a signal which serves to stop the tape at that point whereby only one song is reproduced at a time. On introducing the coin into the machine and selecting a singer the user has the additional interest in not knowing which particular number will be reproduced.

When the songs recorded on the tape are no longer in vogue, or when it is desired to alter the selections it is a simple matter merely to replace the tape cartridge. It has been found that the operation of such apparatus is about 80% more economical than the operation of a more conventional juke-box since it does not use records, operates with about a quarter of the number of parts and is maintained in working order very simply. The manufacturing price of such apparatus is between 75 and 90% less than the juke-boxes presently on the market. The manufacture is simple since any cartridge reproducer having four stereophonic channels can be used in the apparatus with relatively few modifications.

The invention will now be described in more detail, by way of example, with reference to the accompanying drawings in which.

Figure 4A:
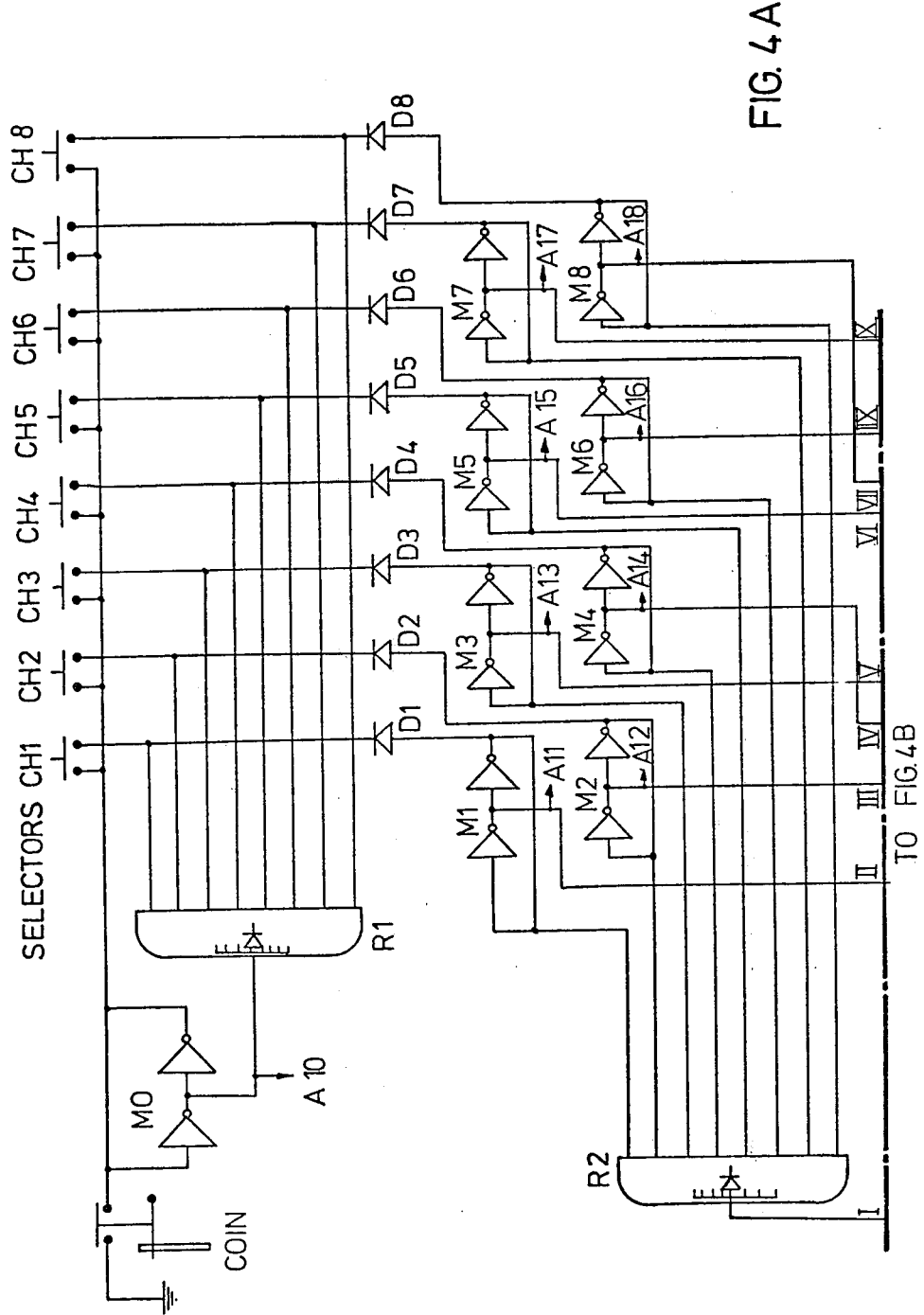

FIGS. 4A, 4B and 4C comprise a detailed circuit diagram.

Figure 1:
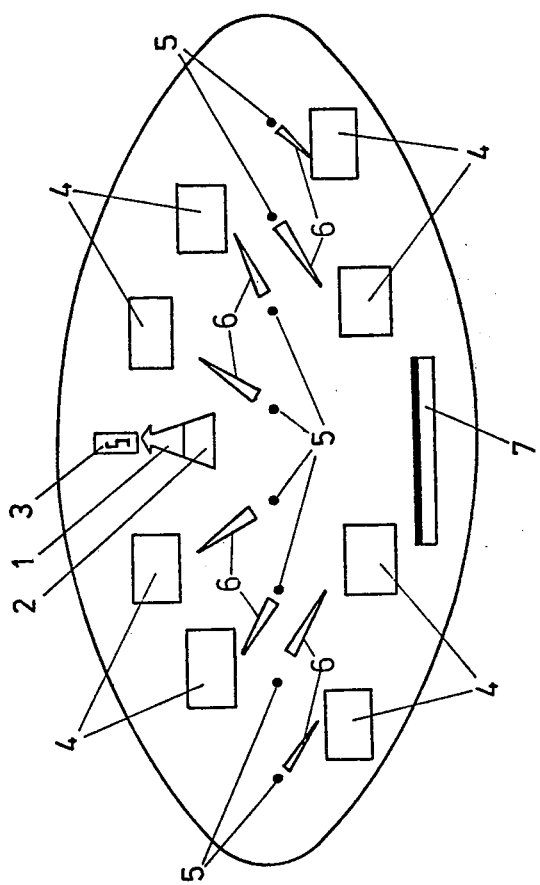
FIG. 1 is a front view of the preferred embodiment of the apparatus, showing the operating panel.
Figure 2:
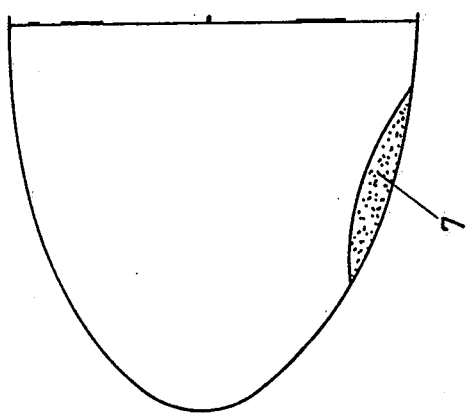
FIG. 2 is a side view showing the position of the speaker.

Referring first to FIGS. 1 and 2, the apparatus is provided with a housing formed on its outer face with an operating panel and at its lower face with an aperture for the speaker of the four channel mono-directional stereophonic type tape reproducer.

As can clearly be seen from FIG. 1, the panel is provided with a slot 3 for the introduction of a coin or disc. A window in the form of an arrow 1 is lit up when the apparatus is in a condition to receive the coin. Once the coin is introduced the light behind the window 1 is disconnected and window 2 immediately below it is lighted with an indication to "make your choice." There are eight windows 4 which are permanently lighted and which contain slides of the individual singers whose interpretations are recorded on the eight tracks on the four channel stereophonic tape to be played by the apparatus. Eight buttons 5 associated with the eight slides windows 4 by means of arrows 6 are provided for permitting the selection of the desired singer. When a given button is depressed, the make your choice window 2 will have its light turned off and the "insert coin" window 1 will be lighted once more so that a further selection can be made on the introduction of a further coin or disc.

When the chosen selector button 5 is depressed, the corresponding arrow 6 will be lighted to indicate to the next user that selection has already been made, the light behind that arrow only being turned off after the end of the reproduction of a song by that singer.

FIG. 2 shows the general transverse shape of the apparatus and also the aperture 7 for the loudspeaker of the apparatus.

If a user selects a singer who has previously been selected and whose song has not been reproduced, that is to say the corresponding arrow 6 is alight, his coin will be returned. Alternatively, by the addition of an extra memory in the electric circuit, it would be possible to store more than one choice of any given singer.

DESCRIPTION OF THE CIRCUIT (FIGS. 3 AND 4)

Figure 4:
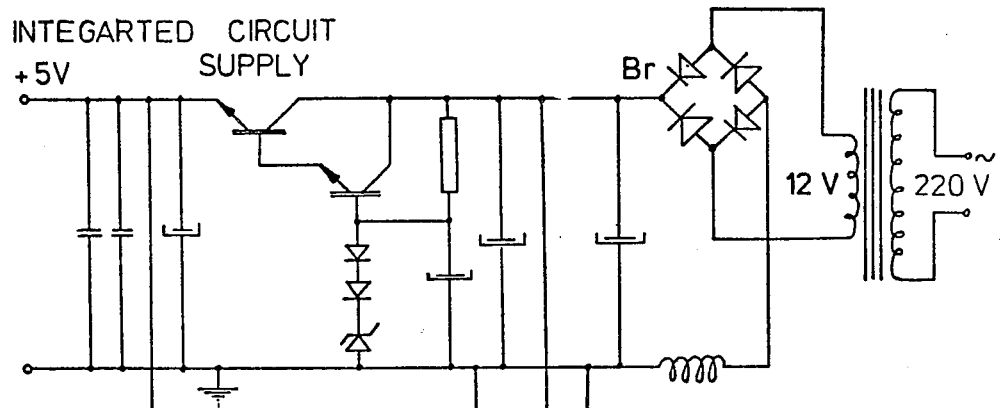
Figure 4:
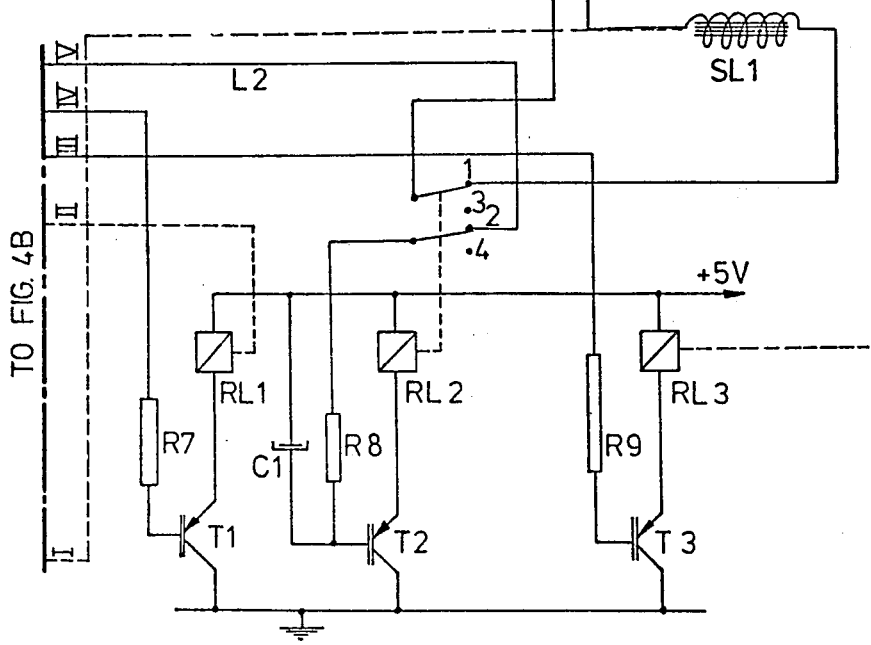

Although many circuits could be used for putting the invention into practice, FIGS. 4 and 5 show one particular circuit in simplified and detailed forms respectively, which has been found to be perfectly adequate.

Figure 3:
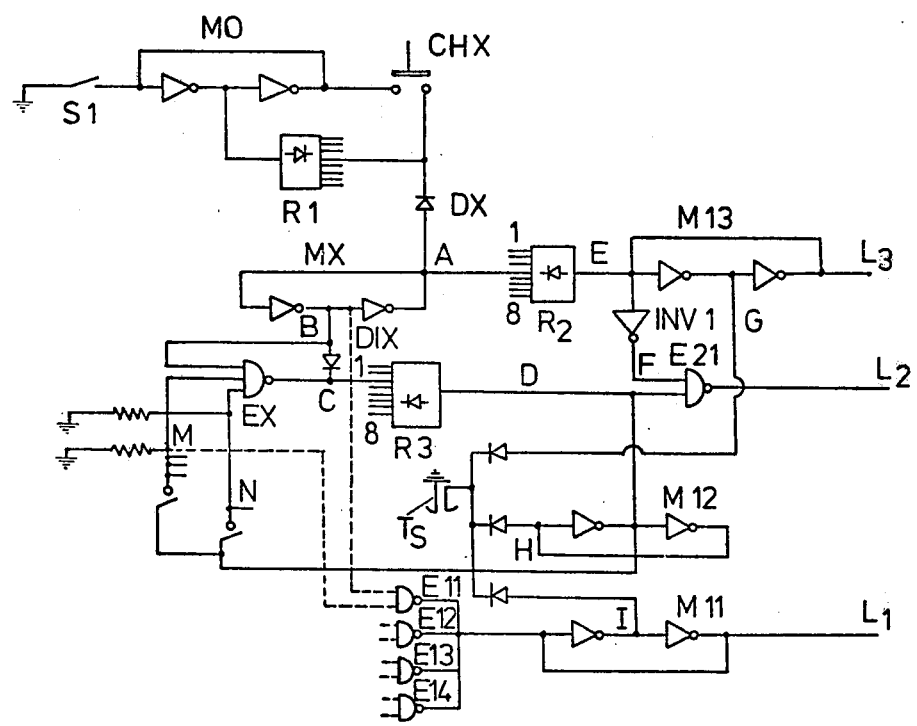
FIG. 3 is a simplified circuit diagram of the electrical components of the apparatus shown in FIG. 1 and 2.

Referring first to FIG. 3, a single microswitch S1 is closed momentarily when a coin or disc is introduced through slot 3 in the control panel. Microswitch S1 is connected between earth and a single memory M0 comprising two inverters having their inputs and outputs in common, It is a characteristic of such a circuit that when connected to other TTL circuits it will only change state if one of its outputs is changed from 1 to 0; if on the other hand, the output is already in 0 and is changed to 1 by another circuit, its state will remain 0.

In view of the above, the instantaneous closure of microswitch S1 will connect memory M0 to earth but the re-opening of the contact of the switch once the coin or disc has passed in the collector within the apparatus will not affect the state of the memory.

There are eight selector switches CH1 to CH8 (FIG. 4) of which an arbitrary one CHX is shown in FIG. 3. After the introduction of the coin and the setting of the memory M0, the appropriate selector switch CHX (corresponding to one of the selector buttons 5 to FIG. 1) will be closed connecting the corresponding memory MX to earth through the corresponding diode DX. As can be seen from FIG. 4 and as is obvious, DX represents one of the diodes D1 to D8 and MX corresponds to a corresponding one of the memories M1 to M8. At the same time earth is applied to one of the eight inputs to AND gate R1 whose output becomes 0 and resets memory M0 to permit the introduction of a further coin and the selection of a further selector switch CHX. Although not shown in the drawing the state of the output and AND gate R1 will control the lighting of the two windows 1 and 2 in the manner already described.

The presence of diode DX merely serves to isolate memory MX from AND gate R1 so that the change of state of memory M0 is not affected by the state of memory MX.

Each individual memory M1 to M8, that is to say MX, is associated with a corresponding NAND gate E1 to E8 (EX) having three inputs coming, respectively from the corresponding individual memory MX, the reproducer head position selector contacts and the reproducer coil selector (that is to say in dependence upon each of the tracks of the normally stereophonic tape to be reproduced). All of the individual memories M1 to M8 are connected to the eight input AND gate R2 which serves to indicate when one of the memories is occupied.

The outputs of the eight NAND gates E1 to E8 (EX in FIG. 3) are connected to the eight input AND gate R3 which indicated the moment when the position corresponding to a chosen memory MX has been reached, that is to say when there are suitable signals at all the inputs of the corresponding gate EX.

As is obvious, each of the reporducer head coils is used for the reproduction of four tracks, that is to say one track from each of the four otherwise stereophonic channels. Referring more specifically to FIG. 4, when relay RL1 is in its rest position, coil 2 is connected, relay RL1 being controlled by line L1 shown in FIG. 3. Should, however, the particular choice correspond to one of the channels associated with received coil 1, the circuit formed by the four input NAND gates E11 to E14 will cause a signal to be passed along line L1 (FIG. 3) to switch relay RL1 (FIG. 4) and connect coil 1.

Referring once more specifically to FIG. 3, in the absence of any selection all the points A (there are eight of them) of the individual memories M1 to M8 will be at 1 and therefore the points B will be at 0. Independently of the state of the other two iputs (track selection), the output of gates of E1 to E8 (that is to say the eight points C) will be at 1. Since the three memories M11, M12 and M13 shown both in FIGS. 3 and 4 have been reset, points G, H and I are at 0.

Points D and E are at 1 since gates R2 and R3 have inputs (points A and C) at 1. Therefore points E and D with relation to memories M13 and M12 are at 1. NAND gate E21 has inputs of 1 at point D and 0 at point F. Its output on line L2 which controls relay RL2 (FIG. 4) for choosing the head position, will then be 1 and the reproducer head position selector solenoid SL1 will be disconnected. On operating one of the keys CH1 to CH8 (CHX), corresponding point A will pass to 0, point E will also pass to 0 and point F will assume a state 1 for energizing the solenoid of relay RL2 (FIG. 4) controlled by line L2 (FIG. 3). On the other hand, point B will become 1 but if the head is not yet in the chosen position or the correct reproducer coil has not yet been selected, one or both of the inputs M and N of corresponding NAND gate EX will be at 0 through the resistors R1 to R6 (FIG. 4). This causes corresponding point C to remain at 1. All the outputs of gates E1 to E8 will be at 1 since, even for that gate for which M and N are at one, the input of the individual memory MX will be at 0, this giving an output of 1, and the output of NAND gate E21 on line L2 will become 0. This will cause capacitor C1 (FIG. 4) to charge until transistor T2 (FIG. 4) begins to conduct, closing the contacts of relay RL2 (position 3 and 4) and consequently opening the supply to its base the relay will remain closed until the capacitor has discharged which will cause a return to the initial position (1 and 2) shown in FIG. 4. The cycle is then repeated. Each time relay RL2 is operated, head position selector solenoid SL1 is energized and mechanically alters the position of the reproducer head and the contacts of the reproducer head position selector switch.

If the selected track is to be reproduced by reproducer coil 1, point B (FIG. 3) of the corresponding individual memory M5, M6, M7 and M8 will be connected to one of the NAND gates E11 to E14, the other input to the gate being connected to one of the four outputs of the reproducer head position selector switch (FIG. 4). When the head is in the correct position both inputs to the gate will be 1 and its output will be 0. This will invert the state of memory M11 and drive transistor T1 so as to excite relay RL1. The contacts of relay RL1 then change position so that reproduction passes to be through coil 1.

If the chosen track is to be reproduced by coil 2, circuit formed by gates E11 to E14 will have an output at 1 since all its outputs coming from the individual memories from M5 to M8 will be 0. This has the effect of de-actuating relay RL1. Once the correct position of the reproducer head and the correct reproducer choice have been attained, the three inputs to the corresponding gate EX (FIG. 3) associated with the chosen individual memory MX will be 1. Its output at point C will then be 0. This 0 will reset the selected individual memory MX through the corresponding one of diodes D11-D18, placing point B at 0 and point A back to 1 which will then cause point C to become 1. The 0 which occurred beforehand at point C changes the state of stable memory M12. This then maintains point D at 0 and will thus prevent actuation of solenoid SL1 since line L2 will be 1.

Capacitor C1 in the solenoid driver circuit absorbs the which appear due to the different delays in the information arriving at points F and D due to the change of state of point A.

Should inputs M and N happen to be at 1 when the memory is chosen, point C will automatically become 0 since the three inputs to EX would be at 1, this resetting the memory since B would become 0 and A would return to 1, returning point C to 1. The 0 which had occurred at point C would change the state of memory M12 and would block the solenoid in the same manner as discussed above.

If another or the same memory is chosen while a song is being played, point A goes to 0 and point B to 1. Point F will remain at 1 but point D will be maintained at 0 keeping gate E21 in its blocked state.

Only on the termination of the song, that is to say when the memories have been reset, may the new choice be considered at which time point D will go to 1 and the solenoid to its new position.

If various choices are made while a single selection is being reproduced they will be played in the following order: first the next song of the singer already being reproduced (should he have been chosen a second time), then the selections recorded on the tracks corresponding to the reproducer coil which is already in operation and finally the recordings to be played by the other coil. Should track three be played, for example, and all tracks have been chosen subsequently, first of all track three will be played with the reproduction of the next song, then track four and finally tracks 1 and 2.

Memories M11, M12 and M13 reset by diodes D21, D22 and D23 at the end of each recording. This is effected by the tape scanner TS detecting a signal recorded on the tape or due to the presence of a metal strip thereacross. Obviously the length of corresponding recordings on the four tracks in any given position on the tape will have to be equal to ensure that when there is a shift from one track to the next, the second recording will be played from the beginning. The signals transduced by the reproducer heads are applied to a conventional amplifier (FIG. 4.)

The circuit supply is derived from an AC source and transformed to 12 volts after which it is rectified by a four diode bridge BR and stabilized by a series circuit to give a DC output of 5 volts (see FIG. 4).

When the apparatus is turned on a special circuit resets all the memories the circuit being formed by capacitor C2, resistors R10 and R11 and transistors T11 to T22. On connecting the network, the voltage is established across R10 and all the transistors conduct placing points A10 to A21 at 0 (FIG. 4). The capacitor C2 is quickly charged up and the transistors are then turned off.

SUMMARY

It will thus be seen that the applicant has developed a new inexpensive multiple selection sound reproducing apparatus which can be manufactured with a basically standard four channel stereophonics tape cartridge reproducer, adapted to a special and relatively simple control system. It will be obvious to those versed in the art that many different control circuits could be designed, but the logic circuit of FIG. 3 has been found to be preferred for its general simplicity.

The selection panel of FIG. 1 is also simple and attractive to the users, the use of slides showing the individual singers being of particular advantage in terms of attracting the users, although, naturally, they could be replaced with any other indication of the recordings made on that particular tape track.

What is claimed as new and desired to be protected by Letters Patent is:

1. A multiple selection sound reproducing apparatus comprising in combination:
   a. a multichannel endless tape having a predetermined number of channels, each having two tracks, each track having a number of different recordings having a common character, and each track having a plurality of transverse control signals separating said recordings;
   b. a tape reproducer having a reproducer head structure with two reproducer coils, amplifier means selectively connectable to either one of said reproducer coils, and a tape drive means;
   c. reproducer head positioning means for positioning said reproducer head in any one of said predetermined number of playing positions;
   d. reproducer coil selector means operable to connect either one of said reproducer coils to said amplifier means;
   e. actuating means to initiate operation;
   f. selector means corresponding to twice the predetermined number of channels on said tape, said selector means made operable by said actuating means, actuation of each of said selector means operates said reproducer head positioning means to position said head in a particular one of said predetermined number of playing positions and operates said reproducer coil selector means to connect a particular one of said reproducer coils to said amplifier means;
   g. detector means to detect said control signals; and
   h. disconnection means to disconnect said motor drive means on detection of a control signal by said detector means.

2. The apparatus according to claim 1, including an operating panel, said actuating means comprising a slot in said panel and switch means coupled to said slot, said selector means including a plurality of operating buttons corresponding in number to said plurality of selector means, and a plurality of illuminated transparencies associated, respectively, with each said button.

3. The apparatus according to claim 2, wherein said multichannel tape comprises a mono directional endless tape recorded in a number of continuous parallel tracks, said number being twice said predetermined number of playing positions.

4. The apparatus according to claim 3, in which said tape is contained in an eight track mono-directional endless tape cartridge.

5. The apparatus according to claim 4, in which each said transparency provides a visual representation of the performer recorded on the corresponding said track of said tape.

6. A multiple selection sound reproducing apparatus comprising in combination:
   a. an eight track mono-directional endless tape cartridge containing a continuous tape having eight tracks each provided with a number of different recordings having a common characteristic and each provided with a plurality of transverse control signals separating said recordings;
   b. a tape reproducer having a reproducer head structure with two reproducer coils, amplifier means selectively connectable to either one of said reproducer coils, and a tape drive means;
   c. reproducer head positioning means for positioning said reproducer head in any one of four playing positions;
   d. reproducer coil selector means to connect either one of said reproducer coils to said amplifier means;
   e. actuating means to initiate operation;
   f. eight selector means made operable by said actuating means, actuation of each said selector means operates said reproducer head positioning means to position said head in a particular one of said playing positions and operates said reproducer coil selector means to connect a particular one of said reproducer coils to said amplifier means;
   g. detector means to detect said control signals;
   h. disconnecting means to disconnect said tape drive means on detection of a control signal by said detector means; and
   i. eight transparencies associated respectively with said eight selector means, each said transparency providing a pictorial representation of said characteristic common to the associated track.

7. The apparatus according to claim 6, in which each said transparency provides a visual representation of the performer recorded on the corresponding track of said tape.

8. A multiple selection sound reproducing apparatus comprising a multi-channel tape reproducer having a tape drive means, an endless tape having four channels, each channel having two tracks, each track having a number of different recordings having a common characteristic, and each track having a plurality of transverse control signals separating said recordings, a reproducer head structure with two reproducer coils, selection means for selecting a desired track and only one of said reproducer coils associated with a selected channel to permit monoral reproduction of only one selected track of any given channel, insertion means connected to make said selection means operative, detector means to detect said control signals and control means for disconnecting the drive of said tape drive means upon detection by said detection means; an operating panel provided with a slot associated with said insertion means, said selection means including a plurality of buttons corresponding in number to twice the number of said channels, said buttons utilized for selecting any one of the individual tracks, indicating means being associated with each button for indicating the nature of the recordings contained on the corresponding track, and wherein said selection means further include a control circuit comprising a single memory whose state is changed upon actuation of said insertion means and whose change of state is applied to an individual track memory when a corresponding one of said selector buttons is pressed, first common gate means connected to each of said individual track memories giving an output to indicate that one of said memories is occupied; second individual track gate means associated with the output of each said individual track memories and with signals indicating the corresponding status of the reproducer head and the status of the corresponding reproducer coil, said second track gate means closed when said memory has been selected, said reproducer head is in a corresponding track position and the corresponding reproducer coil is connected; third common gate means connected to the output of each of said second gate means to control said head position until a selected position is reached and indicated at a corresponding one of said second individual gate means; and switch means associated with four of the eight individual track memories corresponding to tracks to be played by one of said reproducer coils, for switching to said coil in accordance with the states of said four individual track memories; said first common gate means controlling the operation of the tape driver motor of said apparatus when all conditions are satisfied for playing a selected track.

* * * * *